United States Patent [19]
Aizawa

[11] 3,884,106
[45] May 20, 1975

[54] ADJUSTABLE SAW

[75] Inventor: Tsuneo Aizawa, Isehara, Japan

[73] Assignee: Amada Company, Ltd., Isehara, Japan

[22] Filed: Nov. 30, 1973

[21] Appl. No.: 420,438

[30] Foreign Application Priority Data
Oct. 9, 1973 Japan.............................. 48-112864

[52] U.S. Cl...................... 83/453; 83/458; 83/581; 83/809
[51] Int. Cl...................... B23d 55/02; B23d 55/04
[58] Field of Search..................... 83/581, 809–812, 83/453, 454, 458, 490, 473, 477.1

[56] References Cited
UNITED STATES PATENTS

| | | | |
|---|---|---|---|
| 451,089 | 4/1891 | Wagoner............................ | 83/458 X |
| 2,208,582 | 7/1940 | Hollister ........................... | 83/490 X |
| 2,928,439 | 3/1960 | Tester................................ | 83/812 X |
| 3,057,240 | 10/1962 | De Witt............................. | 83/473 X |
| 3,095,673 | 7/1963 | Born, Jr. et al.................... | 83/468 X |
| 3,105,528 | 10/1963 | Loughridge....................... | 83/477 X |
| 3,452,629 | 7/1969 | Jacobson ........................... | 83/812 |
| 3,574,315 | 4/1971 | Boultinghouse .................. | 83/490 X |
| 3,672,251 | 6/1972 | Jagers................................ | 83/490 X |

*Primary Examiner*—J. M. Meister
*Attorney, Agent, or Firm*—Thompson, Birch, Gauthier & Samuels

[57] ABSTRACT

A saw for making cuts at various angles is disclosed. The saw includes a fixed horizontal base having an upstanding post defining an axis about which a platform is rotatably adjustable in opposite directions. The platform in turn supports a vertically pivotable cutting head holding a saw blade. A vise is provided for holding the material to be cut. The vise includes an elongated fixed jaw overlying the rotatably adjustable platform and fixed relative to the base, and a movable clamping jaw carried by the rotatable platform. The aforesaid post is arranged coaxially with the line of intersection between the plane of the fixed vise jaw and cutting plane of the saw blade. The saw further includes indexing means to facilitate movement and positioning of the rotatably adjustable platform in relation to the fixed base.

8 Claims, 7 Drawing Figures

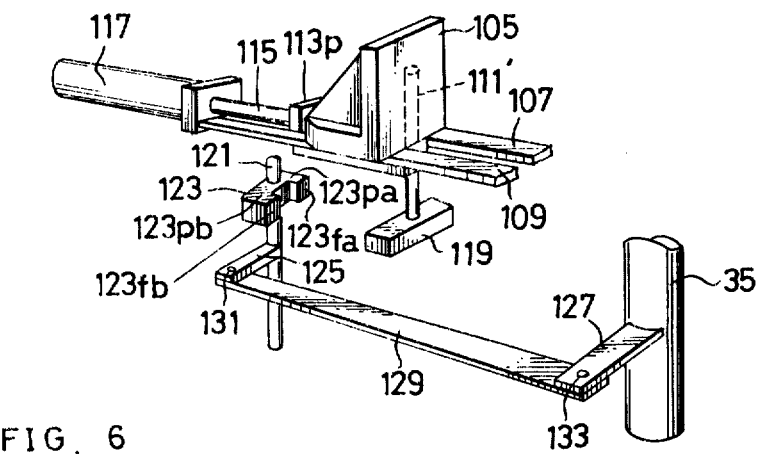
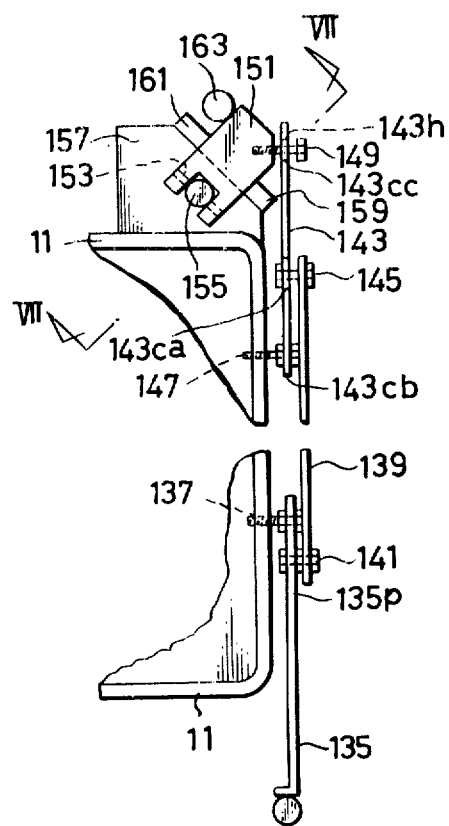
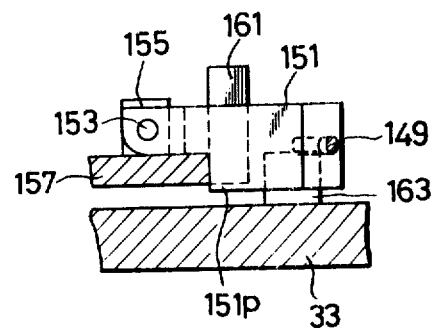
FIG. 5
FIG. 6
FIG. 7

ADJUSTABLE SAW

BACKGROUND OF THE INVENTION

1. Field of the Invention

The present invention relates generally to saws in which a cutting head holding a saw blade is to cut stock or material, and pertains more particularly to saws capable of making cuts at any desired angle.

2. Description of the Prior Art

In many industries, there exists a requirement to cut various kinds of materials at various angles. Particularly in the building industry, shape steels such as H-beams and I-beams are frequently cut at various angles in large quantities for use in steel-frame buildings.

Since saws have long been recognized as an advantageous and economical means for cutting long and heavy stock in large quantities, attempts have been made to make cuts at angles with various conventional saw designs. The most improved of these conventional saws for angular cutting have been so designed that a material holding vise remains stationary and a saw blade held by a cutting head rotates horizontally to desired angular settings relative to the material to be cut. This has made it possible to eliminate additional floor space required to swing the material to be cut and also has made it easy to feed long and heavy stock.

However, these conventional angle-cutting saws have suffered from other shortcomings, and there has been no prior art saw capable of advantageously and economically cutting long and heavy materials at angles. Accordingly, shape steels for use with steel-frame buildings are still usually cut at angles by using oxyacetylene torches.

One of the disadvantages with the conventional angle-cutting saws has been the fact that the vertical pivot axis about which the cutting head holding the saw blade is horizontally rotated to various angular positions is not located at a desirable point with regard to the material holding vise and as the result the saw blade is swung and moved to undesired positions with respect to the material to be cut when it is desired to change the angle of cut. Stated in another way, in conventional saws, the vertical pivot axis for the cutting head holding the saw blade is located apart from or beneath the vise assembly and for this reason the saw blade cannot be rotated for all angular settings in a manner such that all the horizontal kerfs or cuts made on the materials at various angles will extend from a common point with regard to the material holding vise. Accordingly, the saw blade cannot have a common reference point with respect to the vise for any and all angular settings and therefore additional time consuming operations such as markings on the materials to be cut and adjustments of the positionings of the materials have been required when it is desired to change the angle of cut.

Another disadvantage with conventional angle-cutting saws has been that the cutting head holding the saw blade can be rotated only in one direction from normal 90° position and in both directions from the normal position. Accordingly, as an example, when it is desired to cut a material at an angle in one direction from the normal position on one end and then to cut the same material at another angle in the opposite direction from the normal on the other end, it has been necessary to turn the material upside down.

Still another disadvantage with the prior art angle-cutting saws has been that they have not been provided with an indexing means for easily adjusting the positions of the saw blade at some desired angle. Although it is essential that the angle-cutting saws be so constructed that the cutting head holding the saw blade can be rotated to any desired angular position, it is also preferable that the saw blade can be most easily positioned at the angles where cuts are most frequently made, since for example shape steels for use with steel-frame buildings are frequently cut at certain selected angles.

SUMMARY OF THE INVENTION

It is the general object of the present invention to provide an improved saw capable of making cuts at various angles advantageously and economically.

It is a specific object of the present invention to provide a saw which is capable of making cuts at various angles and in which the cutting head holding the saw blade is rotated to various angular settings about a vertical pivot axis which is located where the cutting blade of the saw blade and the plane of the clamping surface of the fixed vise jaw of the material holding vise intersect each other and therefore the saw blade can be rotated horizontally to the various angular positions in a manner such that all the horizontal kerfs or cuts made on the materials at various angles will extend from a common point with respect to the fixed vise jaw.

It is therefore a more specific object of the present invention to provide a saw of the character described wherein the cutting head holding the saw blade is mounted for vertical pivotal movement on a platform so as to swing up and down to cut the materials, and the platform in turn can be horizontally swung in its entirety about a vertical axis which is located in alignment with a vertical line where the cutting plane of the saw blade and the plane of the clamping surface of the fixed vise jaw of the vise intersect each other so that the saw blade may be swung to various angular positions.

It is another object of the present invention to provide a saw of the character described wherein the saw blade can be horizontally swung in both directions from the normal 90° position.

It is a further object of the present invention to provide a saw of the character described which is provided with an indexing means for easily positioning the saw blade at certain selected angles and locking the same there.

It is a still further and important object of the present invention to provide a saw of the character described which is provided with a novel and improved material holding vise.

Other and further objects and advantages of the present invention will be apparent from the following description and accompanying drawings which, by way of illustration, show a preferred embodiment of the present invention and the principle thereof.

3

Figure 3:
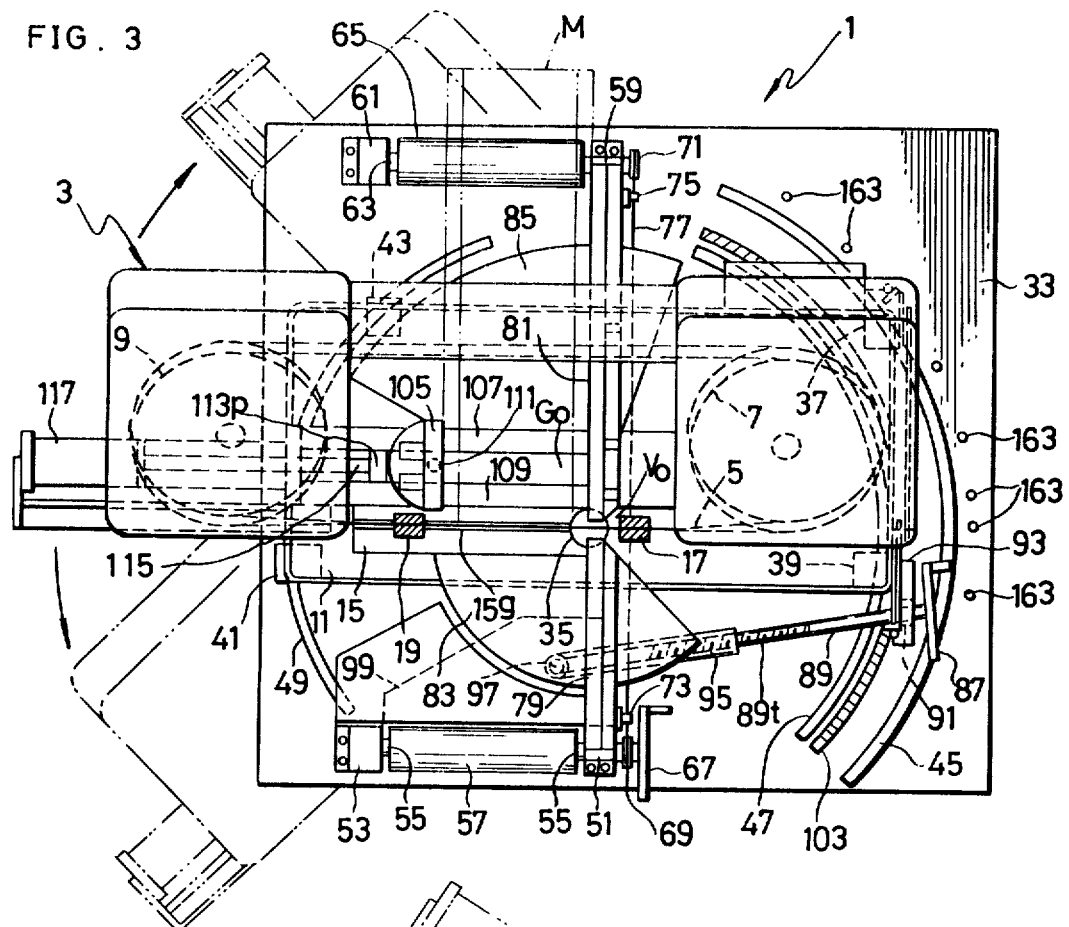
FIG. 3 is a plan view of the saw shown in FIGS. 1 and 2, with portions of the top thereof being omitted for clarity.
Figure 4:
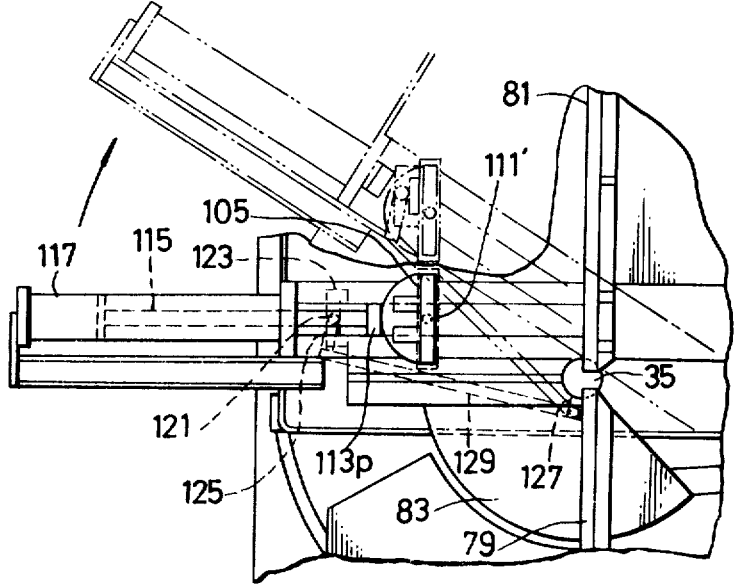

FIG. 4 is a partial plan view similar to FIG. 3 showing a modified form of a portion of the machine according to the present invention with parts thereof omitted for clarity.

FIG. 5 is an exploded perspective view showing components of the modified form illustrated in FIG. 4.

FIG. 6 is an enlarged plan view showing the right-hand side of the saw shown in FIG. 3, with parts thereof being omitted for clarity.

FIG. 7 is a sectional view taken substantially along the line VII—VII of FIG. 6.

DESCRIPTION OF THE PREFERRED EMBODIMENTS

Figure 1:
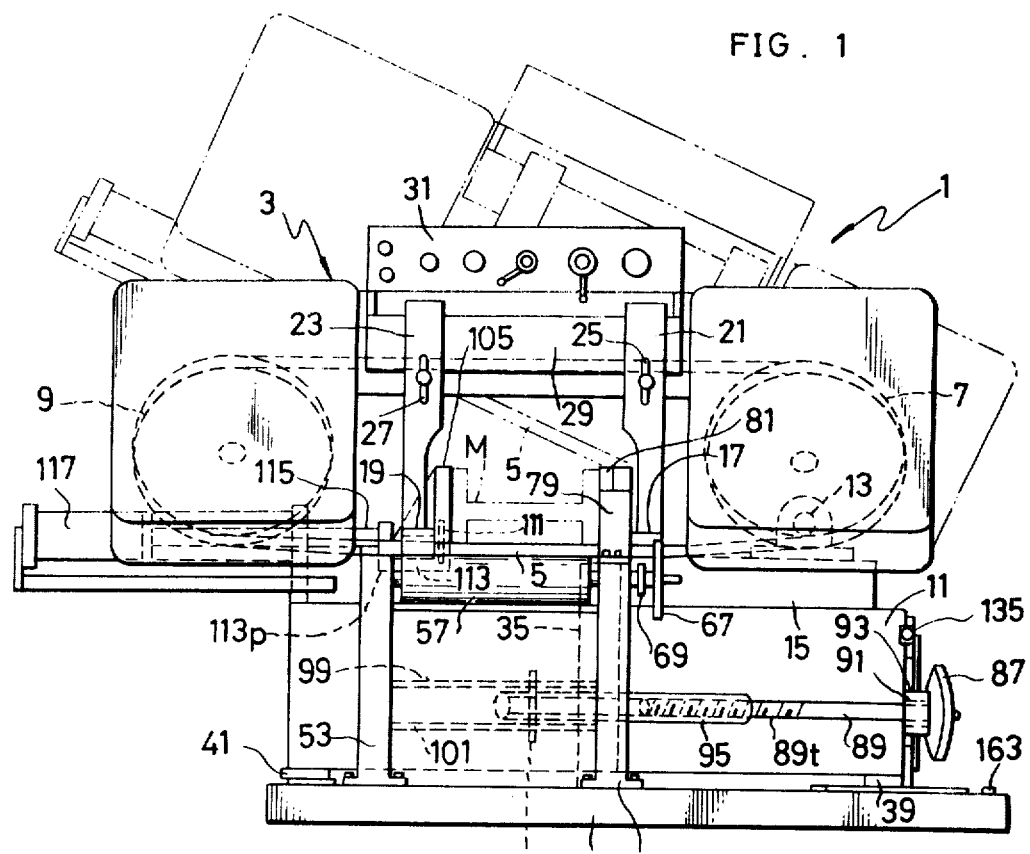
FIG. 1 is a front view of a saw according to the present invention.
Figure 2:
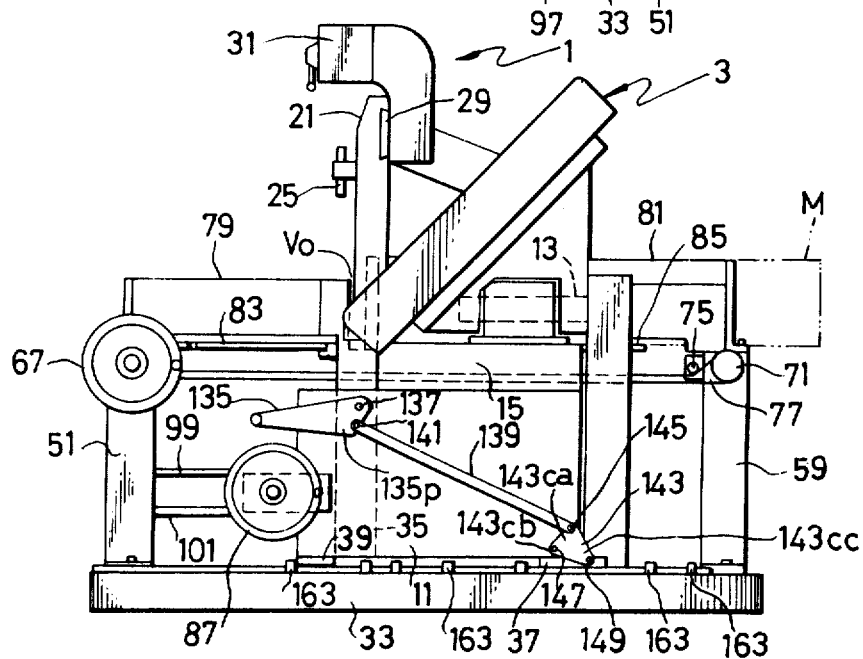
FIG. 2 is a right side view of the saw shown in FIG. 1.

Referring initially to FIGS. 1-3 of the accompanying drawings, it will be seen that the invention has been illustrated in connection with a particular type of saw, namely a horizontal bandsaw. It will be understood, however, that the invention is not limited in application to this particular type of saw, and that as hereinafter employed, the term "saw" is intended to include not only horizontal bandsaws of the type herein depicted, but also other saw types, for example hacksaws, circular saws, etc.

In the drawings, a horizontal bandsaw machine generally designated by the numeral 1 is conventional in that a cutting head 3 enclosing therein a bandsaw blade 5 trained over a driving wheel 7 and a driven wheel 9 is pivotally supported on an elongated platform 11 by means of a hinge pin 13. The hinge pin is part of a work table 15 which represents the upper surface of the platform 11. The cutting head 3 is pivotally adjustable about the axis of pin 13 as shown by the phantom lines in FIG. 1. As is also conventional, the bandsaw blade 5 is slidably held by a pair of saw guides 17 and 19 respectively supported by guide arms 21 and 23. The guide arms depend downwardly from and are adjustably fixed by knobs 25 and 27 to a guide plate 29 which forms a part of the cutting head 3 and which is located beneath a control console 31. The bandsaw blade 5 is adapted to cut stock or material M which has been placed on the work table 15.

It is a feature of the present invention that the platform 11 (and the components mounted therein) is mounted on a fixed base 33 for rotation in opposite directions to various angular positions around a vertical pivot axis defined by a central post 35 which extends vertically from the base 33. The platform 11 is rotated to various angular positions when it is desired to change the anglle of cut. For the purpose of easy horizontal rotation of the platform 11, it is provided at its bottom corners with four antifriction shoes 37, 39, 41, and 43, and the base 33 has arcuate slideways 45, 47, and 49 fixed on its top surface, so that the antifriction shoes may easily slide on the slideways.

a pair of posts 51 and 53 are vertically provided at the front end of the base 33. These posts rotatably support the shaft 55 of a front roller 57 for feeding the material M. Another pair of posts 59 and 61 are located at the rear end of the base 33. These posts rotatably support the shaft 63 of a rear feed roller 65. The shaft 55 of the front feed roller 57 is provided with a handwheel 67 and a gear 69. The shaft 63 for the rear feed roller 65 has a gear 71, fixed at the end thereof. There are auxiliary gears 73 and 75 provided in the vicinity of the gears 69 and 71, respectively. The front feed roller 57 and the rear feed roller 65 are mechanically connected by a chain 77 trained over the gears 69, 71, 73 and 75 so that they may be rotated simultaneously to feed and position the material M to be cut when the handwheel 67 is rotated. The material M to be cut is usually fed onto the work table 15 from the rear of the machine.

It is a distinctive feature of the present invention that the front post 51 and the rear post 59 described above are so located as to substantially form a row with the central post 35 acting as the vertical pivot axis for the horizontal rotation of the platfrom 11. Two elongated fixed vise jaws 79 and 81 of the material holding vise are fixedly bridged or spanned across the platform 11 and the work table 15 between the front post 51 and the central post 35 and between the central post 35 and the rear post 59, respectively. The fixed vise jaws 79 and 81 are integral elements of the novel material holding vise which forms a part of the present invention and will be hereinafter described in greater detail. These fixed jaws at times will be called hereinafter "auxiliary fixed vise jaw 79" and "main vise jaw 81," respectively, since the material M to be cut is mainly held by the rear fixed vise jaw 81. Thus, it will now be understood that the vise jaws 79 and 81 remain fixed relative to the base 33, and the platform 11 and its work table 15 can be horizontally rotated about the central post 35 beneath the fixed vise jaws 79 and 81.

Also, as is best shown in FIG. 3, it is important to note that the central post 35 is so located that its axis coincides with a vertical line where the cutting plane of the bandsaw blade 5 and the plane of the clamping surface of the fixed vise jaws 79 and 81 intersect each other. Stated more particularly, it is preferable that the central axis of the central post 35 is aligned coaxially with a vertical line where the cutting plane of the front or outer extreme corners of the saw teeth of the bandsaw blade 5 intersects the plane of the clamping surface of the fixed vise jaws 79 and 81. Thus, when it is desired to change the angle of cut, the bandsaw blade 5 is always rotated to various angular settings about the axis which is located where the cutting plane of the bandsaw blade 5 (strictly the cutting plane of the front extreme corners of the saw tooth) and the plane of the clamping surface of the fixed vise jaws 79 and 81 intersect each other. Accordingly, the bandsaw blade 5 can be always rotated in a manner such that all the horizontal kerfs or cuts made on the material M at various angles will extend from a common point with regard to the material holding vise and therefore it has a common reference point for any and all angular positions. Accordingly, when it is desired to change the angle of cut, it is only necessary to rotate the platform 11 carrying the cutting head 3 and its saw blade 5 to the desired angular position and then it is possible to immediately cut the material M at the desired angle without any extra time consuming operations such as adjusting the feeding or positioning of the material M. Also, since the material M is usually fed from the rear side of the machine to the front side of the same, it will now be understood that strictly it is preferable that the bandsaw blade 5 be rotated about a vertical axis where the cutting plane of the front corners of the saw teeth and the clamping plane of the fixed vise jaws 79 and 81 intersect each other in order to make accurate the length of the pieces cut from the material M.

As shown in FIGS. 2 and 3, the ends of the auxiliary fixed vise jaw 79 and the main fixed vise jaw 81 are so spaced adjacent to the central post 35 as to form an opening VO which is substantially V-shaped as viewed from the top. Accordingly, the bandsaw blade 5 can be lowered into this opening to cut the material M and also be horizontally swung to change the angle of cut. Also, for the purpose of enabling the bandsaw blade 5 to cut through the material M without damaging any portion of the machine, the top of the central post 35 terminates at a level beneath that of the top surface of the work table 15. Furthermore the work table 15 is provided with an elongated transverse groove 15g at its top portion which coincides with the cutting plane of the bandsaw blade 5. Arcuate material support tables 83 and 85 are fixedly provided at the front and the rear of the platform 11 to cooperate with the work table 15 in receiving and supporting the material M.

In order to rotate the platform 11 to the desired positions, there is provided at the front of the platform 11 a handwheel 87 which is secured to one end of a shaft 89 having a threaded portion 89t at its other end. The shaft 89 is rotatably supported through a self-aligning bearing 91 by a support member 93 fixed to the front portion of the right-hand side wall of the platform 11. The self-aligning bearing 91 is of a type enabling the shaft 89 to horizontally swing and is held within the support member 93. The threaded portion 89t of the shaft 89 is engaged within an elongated tubular nut 95 which is pivotally supported by a vertical pin 97 between two horizontal plates 99 and 101 which are secured in a suitable manner to the front posts 51 and 53.

For accurately positioning the platform 11, the base 33 is provided at its top surface with arcuate graduations 103 indicating various angles, with which a suitable pointer (not shown) fixed to a portion of the platform 11 cooperates to measure the angular position of the platform. Thus, it will now be understood that the platform 11, cutting head and the bandsaw blade 5 can be easily rotated in either direction from the normal 90° position relative to the material M, as shown by the phantom lines and the arrows in FIG. 3 when the handwheel 87 is rotated.

As shown in FIGS. 1 and 3, a movable vise jaw 105 is slidably mounted on guide plates 107 and 109 fixed to the top of the work table 15 in a manner such that its bottom projection depends into an opening GO formed between the guide plates 107 and 109. The movable vise jaw 105 is so designed as to be horizontally rotatable in relation to the guide plates 107 and 109 about a pin 111 vertically fixed to a carrier member 113 which is slidable placed beneath the guide plates 107 and 109. The carrier member 113 is provided with a vertical projection 113p connected to the piston rod 115 of a hydraulic cylinder 117, mounted at the left-hand side of the platform 11. Thus, the movable vise jaw 105 is moved on the guide plates 107 and 109 with the guide thereof towards and away from the fixed vise jaws 79 and 81 to grip and loose the material M to be cut.

In light of the above, it will be understood that the movable vise jaw 105 is horizontally swung together with the platform 11 in either direction from the normal 90° position shown in FIG. 3 around the central post 35. However, since the movable vise jaw 105 is so designed as to horizontally rotate on its pin 111, it can rotate in response to the changes of the angle of cut to clamp the material M in cooperation with the fixed vise jaws 79 and 81. Also, since the fixed vise jaws 79 and 81 have been made long enough to extend from the front post 51 to the rear post 59, the movable vise jaw 105 is able to hold the material M in cooperation with the fixed vise jaws 79 and 81 at any angles.

As shown in FIGS. 4 and 5, a modified form of the material holding vise can be employed so as to enable the movable vise jaw 105 to positively respond to the changes of the angle of cut. The movable vise 105 in the modified form is the same one as that shown in FIGS. 1 and 3, but, as best shown in FIG. 5, it is fixedly secured to a pivot pin 111 which extends rotatably through the carrier member 113 and is provided at its lowermost end with a horizontal rectangular rocking member 119 fixed thereto. The rectangular rocking member 119 is fixed to the pin 111 in a manner such that it is parallel to the clamping surface of the movable vise jaw 105.

Just under the center line between the guide plates 107 and 109 and in the vicinity of the left-hand end of the platform 11, there is provided a vertically extending rotatable pivot shaft 121. The pivot shaft 121 is provided at its upper end with a horizontal wing-like member 123 fixed thereto, which has two projections 123pa and 123pb and is so designed that its vertical faces 123fa and 123fb will be contacted by the rocking member 119. Also, the pivot shaft 121 is provided beneath the wing-like member 123 with a radially extending arm 125 fixed thereto. The central post 35 has a similar arm 127 which is radially fixed thereto at the same height as the arm 125. The two arms 125 and 127 are pivotally interconnected by an intermediate link 129 through pins 131 and 133. The arrangement is such that the distance between the pins 131 and 133 is equal to that between the axes of the pivot shaft 121 and the central post 35 while the distance between the pin 131 and the axis of the pivot shaft 121 is equal to the distance between the pin 133 and the axis of the central post 35. Also, the wing-like member 123 is so designed that its vertical faces 123fa and 123fb are always parallel to the clamping surfaces of the fixed vise jaws 79 and 81. Accordingly, it will be understood that the quadrilateral formed by the pivot axes of the pivot shaft 121 and the central post 35 and the pins 131 and 133 is always a parallelogram and accordingly the arms 125 and 127 and the link 129 will act as a parallel link mechanism.

In the modified vise described above, when the movable vise jaw 105 is moved away from the material M after completion of one cycle of cutting operation, the rocking member 119 is also moved therewith and is brought into contact with the wing-like member 123 at its rearward limit of travel. Next, when the platform 11 is being rotated as shown by the phantom lines and the arrow in FIG. 4 to change the angle of cut, the pivot shaft 121 is rotated through the action of the link mechanism since the link arm is always fixed relative to the central post 35, and as the result the wing-like member 213 is kept parallel to the fixed vise jaws 79 and 81. Accordingly, the rocking member 119 in engagement with the wing-like member 123 is rotated therewith, and accordingly the movable vise jaw 105 which is fixed relative to the rocking member 119 through the pin 111 is also rotated so that its clamping surface may be kept parallel to the fixed vise jaws 79 and 81. Thus, when the platform 11 is rotated to change the angle of cut, the movable vise jaw 105 in the modified form of the material holding vise will respond to the change of the angle of cut before it is brought into contact with the material M.

As is best shown in FIGS. 2 and 6, a substantially three-cornered lever 135, for an indexing mechanism for easily positioning the platform 11 and the bandsaw blade 5 is provided at the right-hand end of the platform 11 and is pivotally supported at its end portion thereon by a pin 137. The lever 135 is provided at its mid-portion with a projection or corner 135p which is pivotally connected with an elongated connecting link 139 by means of a pin 141. Thus it will be understood that the lever 135 is designed to work as a kind of bell crank. The connecting link 139 is designed to depend obliquely towards the lower rear corner of the platform 11 and is pivotally connected with a plate 143 having three corners 143ca, 143cb, and 143cc by means of a pin 145. The three-cornered plate 143 is pivotally supported at its corner 143cb by a pin 147 horizontally fixed to the side corner of the platform 11, and thus the three-cornered plate 143 works as a kind of bell crank. Also, the three-cornered plate 143 is provided at its corner 143cc with a relatively large hole 143h through which a pin 149 is put to connect the three-cornered plate 143 with a yoke member 151. As shown in FIG. 6, the hole 143h is formed sufficiently larger than the pin 149 so that the latter may be swung universally therein.

As is best shown in FIGS. 6 and 7, the yoke member 151 provided at its bottom with a downward projection 151p and it is so designed as to be swung up and down about a pin 153 supported by a vertical supporter member 155 which is planted on a corner plate 157 mounted on the bottom corner of the platform 11. The yoke member 151 is normally at rest on the corner plate 157. In order to guide the yoke member 151 when it is swung up and down, two guide members 159 and 161 are vertically fixed at the end of the corner plate 157.

Thus, it will now be apparent that when the lever 135 is rotated in the clockwise direction around the pin 137, the three-cornered plate 143 is rotated in the counterclockwise direction about the pin 147 to swing up the yoke member 151 about the pin 153.

A plurality of cylindrical projecting pins or stops 163 are arranged on the top surface of the base 33 at an equal radial distance from the pivot axis defined by post 35. These stops 163 are so located that they will stop the platform 11 in such a manner as shown in FIGS. 6 and 7 at various angular positions where cuts are most frequently made. In other words each of the stops 163 has been given one of the angles where cuts are most frequently made and is designed to position the machine proper so that the material M will be cut at such an angle.

Accordingly, when it is desired to rotate the platform 11 and the bandsaw blade 5 to one of the angular positions where cuts are most frequently made, it is only necessary to raise the lever 135 to swing up the yoke member 151, turn the handwheel 87 to rotate the machine proper to bring the yoke member 151 near to one of the projecting stoppers corresponding to the desired angular position, and then lower the yoke member 151 and rotate further the machine proper to bring the yoke member 151 into contact with the appropriate stop 163. Thus, when it is desired to cut the material M at one of the angles where cuts are most frequently made, it is possible to easily position the platform 11 and the bandsaw blade 5 at the desired angle without any superfluous operations such as setting the pointer at the desired angle of the graduations 103 provided on the base 33. When it is required to position the machine proper at an angular position at which cuts are seldom made and for which none of the stops 163 is provided, of course, the machine proper has to be rotated so that the pointer will be brought into alignment with the desired angle of the graduations 103.

As has been so far described, the saw according to the present invention has been improved as a whole to meet all of the requirements for cutting the various materials at right angles or any desired angles advantageously and economically.

Since the platform 11 and the cutting head with its saw blade are rotated around an axis which is located where the cutting plane of the saw blade and the clamping plane of the fixed vise jaws intersect each other when it is desired to change the angle of cut variously, it is possible to easily feed and position the materials to be cut into the cutting position without any superfluous operations. Since the platform 11 is designed to be rotated horizontally in both directions from the normal 90° position, the material can be easily cut at any desired angle without any troublesome and time consuming operations such as turning the material upside down. These advantages have been made possible by the novel material holding vise having the two elongated fixed vise jaws and the movable vise jaw that is designed to be rotated horizontally so as to respond to the change of the angle of cut. Also, the material holding vise can be modified so that the movable vise jaw may respond to the change of the angle of cut more positively. Furthermore, the saw according to the presesnt invention is provided with a novel indexing mechanism for easily positioning the machine proper at the various angular positions where cuts are most frequently made, and accordingly the machine proper and the saw blade can be easily positioned at any one of these desired positions without any troublesome operations such as setting the pointer at the desired angles of the graduations.

It is my intention to cover all changes and modifications of the embodiments herein described for illustrative purposes which do not depart from the spirit and scope of the invention as claimed.

I claim:

1. A saw comprising in combination: a fixed base; platform means mounted on said base for rotation about an axis extending vertically therefrom, said platform means having a material support surface for receiving and supporting the material to be cut; a cutting head carrying a saw blade, said cutting head being mounted on said platform means for movement relative to said material support surface when performing a cut through material positioned thereon; and clamping means for holding the material to be cut during a cutting operation, said clamping means including first jaw means having an elongated clamping surface fixed relative to said base, and second jaw means pivotally carried by said platform means and movable relative to said first jaw means to releasably hold the said material against said first jaw means during a cutting operation; the said axis being arranged coaxially with the line of intersection between said elongated clamping surface and the cutting plane of said saw blade.

2. The apparatus as claimed in claim 1 wherein said platform means is rotatable in both a clockwise and counterclockwise direction about said axis.

3. The apparatus as claimed in claim 1 wherein said axis is defined by a post extending vertically from said base, and wherein said first jaw means includes a pair of aligned elongated members having adjacent ends supported on said post and spaced on either side of the cutting plane of said saw blade.

4. The apparatus as claimed in claim 3 wherein said second jaw means is pivotally carried on said platform means for movement about a second axis parallel to said first mentioned axis.

5. The apparatus as claimed in claim 4 wherein said second jaw means is freely pivotable about said second axis.

6. The apparatus as claimed in claim 4 wherein said second jaw means is operatively connected to said post through an intermediate linkage arrangement which maintains said second jaw means in parallel relationship to said elongated clamping surface, and which controls the pivotal movement of said second jaw means about said second axis in response to rotative movement of said platform means relative to said base.

7. The apparatus as claimed in claim 1 further characterized by a plurality of fixed stop members on said base, said stop being arranged radially in relation to said axis, and means on said platform for releasably engaging said stop members to position said platform means and the cutting head carried thereon at selected angles relative to the elongated clamping surface of said first jaw means.

8. The apparatus as claimed in claim 1 further characterized by means operatively connected between said platform means and said base for rotatably adjusting the former relative to the latter about said axis.

* * * * *